(12) United States Patent
Weber et al.

(10) Patent No.: US 6,449,092 B1
(45) Date of Patent: *Sep. 10, 2002

(54) REFLECTIVE POLARIZERS HAVING EXTENDED RED BAND EDGE FOR REDUCED OFF AXIS COLOR

(75) Inventors: Michael F. Weber, Shoreview; Brian D. Cull, Maplewood; Kevin M. Hoffman, St. Paul; Andrew J. Ouderkirk, Woodbury, all of MN (US)

(73) Assignee: 3M Innovative PropertiesCompany, St. Paul, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 09/566,181

(22) Filed: May 5, 2000

Related U.S. Application Data

(62) Division of application No. 09/143,475, filed on Aug. 28, 1998, now Pat. No. 6,088,159, which is a continuation of application No. 08/690,527, filed on Jul. 31, 1996, now Pat. No. 5,808,794.

(51) Int. Cl.[7] .................................................. G02B 5/30
(52) U.S. Cl. ........................ 359/487; 359/495; 359/502; 349/97
(58) Field of Search .......................... 359/487, 488, 359/495, 498, 502; 349/96, 97; 362/19, 31

(56) References Cited

U.S. PATENT DOCUMENTS

| 540,768 A | 6/1895 | Western |
| 3,124,639 A | 3/1964 | Kahn ............................. 88/65 |
| 3,610,729 A | 10/1971 | Rogers ........................ 350/157 |
| 3,647,612 A | 3/1972 | Schrenk et al. ............. 161/165 |

(List continued on next page.)

FOREIGN PATENT DOCUMENTS

| CA | 1327286 | 3/1994 |
| JP | 2-308106 | 12/1990 |
| JP | 5-288910 | 11/1993 |

(List continued on next page.)

OTHER PUBLICATIONS

Alfrey, Jr. et al., Physical Optics of Iridescent Multilayered Plastic Films, Polymer Engineering and Science, vol. 9, No. 6, Nov. 1969.

Hodgkinson et al, Effective principal refractive indices and column angles for periodic stacks of thin birefringent films, Optical Society of America, vol. 10, No. 9, p. 2065–2071, Sep. 1993, pp. 2065–2071.

Im, J. et al., Coextruded Microlayer Film and Sheet, Journal of Plastic Film and Sheeting, vol. 4, p. 104–15 (Apr., 1988).

Radford et al., Reflectivity of Iridescent Coextruded Multilayered Plastic Films, Polymer Engineering and Science, vol. 13, No. 3, (May 1973); Dow Chemical Co., American Society Symposium on "Coextruded Plastic Films, Fibers, Composites", Apr. 9–14, 1972.

(List continued on next page.)

*Primary Examiner*—Mark A. Robinson
(74) *Attorney, Agent, or Firm*—William D. Miller

(57) ABSTRACT

Reflective polarizers, which transmit one polarization and reflect the other polarization, have an extended red band edge in the off-axis transmission spectrum to control off axis color (OAC) hue. To control the OAC hue, the red band edge of the off-axis transmission spectrum, or OAC spectrum, is shifted beyond the boundary for red light, or to at least 600 nm. Even more preferably, the OAC spectrum is extended further into the red than any red emission peak of an associated lamp providing light into a system in which the reflective polarizer is used. The concept applies equally well to any type of reflective polarizer, such as multilayer reflective polarizers, cholesteric reflective polarizers, and the like. The resulting reflective polarizers are very useful for many different applications, such as liquid crystal displays.

11 Claims, 5 Drawing Sheets

U.S. PATENT DOCUMENTS

| | | | |
|---|---|---|---|
| 3,711,176 A | 1/1973 | Alfrey, Jr. et al. | 350/1 |
| 3,759,647 A | 9/1973 | Schrenk et al. | 425/131 |
| 3,773,882 A | 11/1973 | Schrenk | 264/171 |
| 3,801,429 A | 4/1974 | Schrenk et al. | 161/181 |
| 3,860,036 A | 1/1975 | Newman, Jr. | 138/45 |
| 4,310,584 A | 1/1982 | Cooper et al. | 428/212 |
| 4,446,305 A | 5/1984 | Rogers et al. | 528/348 |
| 4,520,189 A | 5/1985 | Rogers et al. | 528/331 |
| 4,521,588 A | 6/1985 | Rogers et al. | 528/363 |
| 4,525,413 A | 6/1985 | Rogers et al. | 428/212 |
| 4,540,623 A | 9/1985 | Im et al. | 428/220 |
| 4,720,426 A | 1/1988 | Englert et al. | 428/344 |
| 4,937,134 A | 6/1990 | Schrenk et al. | 428/213 |
| 5,089,318 A | 2/1992 | Shetty et al. | 428/212 |
| 5,094,788 A | 3/1992 | Schrenk et al. | 264/171 |
| 5,094,793 A | 3/1992 | Schrenk et al. | 264/171 |
| 5,095,210 A | 3/1992 | Wheatley et al. | 250/339 |
| 5,103,337 A | 4/1992 | Schrenk et al. | 359/359 |
| 5,122,905 A | 6/1992 | Wheatley et al. | 359/586 |
| 5,122,906 A | 6/1992 | Wheatley | 359/586 |
| 5,126,880 A | 6/1992 | Wheatley et al. | 359/587 |
| 5,149,578 A | 9/1992 | Wheatley et al. | 428/213 |
| 5,188,760 A | 2/1993 | Hikmet et al. | 252/299.01 |
| 5,202,074 A | 4/1993 | Schrenk et al. | 264/241 |
| 5,211,878 A | 5/1993 | Reiffenrath et al. | 252/299.63 |
| 5,217,794 A | 6/1993 | Schrenk | 428/220 |
| 5,233,465 A | 8/1993 | Wheatley et al. | 359/359 |
| 5,234,729 A | 8/1993 | Wheatley et al. | 428/30 |
| 5,235,443 A | 8/1993 | Barnik et al. | 359/37 |
| 5,269,995 A | 12/1993 | Ramanathan et al. | 264/171 |
| 5,278,694 A | 1/1994 | Wheatley et al. | 359/359 |
| 5,294,657 A | 3/1994 | Melendy et al. | 524/270 |
| 5,316,703 A | 5/1994 | Schrenk | 264/1.3 |
| 5,319,478 A | 6/1994 | Fijnfschilling et al. | 359/53 |
| 5,339,198 A | 8/1994 | Wheatley et al. | 359/359 |
| 5,360,659 A | 11/1994 | Arends et al. | 428/216 |
| 5,389,324 A | 2/1995 | Lewis et al. | 264/171 |
| 5,424,119 A | 6/1995 | Phillips et al. | 428/328 |
| 5,448,404 A | 9/1995 | Schrenk et al. | 359/584 |
| 5,451,449 A | 9/1995 | Shetty et al. | 428/195 |
| 5,453,859 A * | 9/1995 | Sannohe et al. | 359/63 |
| 5,486,935 A | 1/1996 | Kalmanash | 359/37 |
| 5,486,949 A | 1/1996 | Schrenk et al. | 359/498 |
| 5,540,978 A | 7/1996 | Schrenk | 428/212 |
| 5,552,927 A | 9/1996 | Wheatley et al. | 359/359 |
| 5,568,316 A | 10/1996 | Schrenk et al. | 359/584 |
| 5,612,820 A | 3/1997 | Schrenk et al. | 359/498 |
| 5,629,055 A | 5/1997 | Revol et al. | 428/1 |
| 5,686,979 A | 11/1997 | Weber et al. | 349/96 |
| 5,691,789 A | 11/1997 | Li et al. | 349/98 |
| 5,699,188 A | 12/1997 | Gilbert et al. | 359/584 |
| 5,721,603 A | 2/1998 | De Vaan et al. | 349/194 |
| 5,737,044 A * | 4/1998 | Van Haaren et al. | 349/61 |
| 5,744,534 A | 4/1998 | Ishiharada et al. | 524/442 |
| 5,751,388 A | 5/1998 | Larson | 349/96 |
| 5,767,935 A | 6/1998 | Ueda et al. | 349/112 |
| 5,770,306 A | 6/1998 | Suzuki et al. | 428/328 |
| 5,783,120 A | 7/1998 | Ouderkirk et al. | 264/134 |
| 5,793,456 A | 8/1998 | Broer et al. | 349/98 |
| 5,808,794 A | 9/1998 | Weber et al. | 359/487 |
| 5,825,542 A | 10/1998 | Cobb, Jr. et al. | 359/487 |
| 5,825,543 A | 10/1998 | Ouderkirk et al. | 359/494 |
| 5,882,774 A | 3/1999 | Jonza et al. | |
| 5,940,149 A | 8/1999 | Vanderwerf | |
| 5,962,114 A | 10/1999 | Jonza et al. | |
| 5,965,247 A | 10/1999 | Jonza et al. | |
| 6,088,159 A * | 7/2000 | Weber et al. | 359/487 |

FOREIGN PATENT DOCUMENTS

| | | |
|---|---|---|
| WO | WO 91/09719 | 7/1991 |
| WO | 6-11607 | 1/1994 |
| WO | WO 95/27919 | 4/1995 |
| WO | WO 95/17303 | 6/1995 |
| WO | WO 95/17691 | 6/1995 |
| WO | WO 95/17692 | 6/1995 |
| WO | WO 95/17699 | 6/1995 |
| WO | WO 96/19347 | 6/1996 |
| WO | WO 97/01440 | 1/1997 |
| WO | WO 97/01774 | 1/1997 |
| WO | WO 97/32226 | 9/1997 |
| WO | WO 99/36248 | 7/1999 |
| WO | WO 99/36262 | 7/1999 |

OTHER PUBLICATIONS

Scheffer, Terry J., "Twisted Nematic Display with Cholesteric Reflector", Journal of Applied Physics, vol. 8, pp. 1441–1448 (1975).

Schrenk et al., Nanolayer polymeric optical films, Tappi Journal, pp. 169–174, Jun., 1992.

Schrenk et al., Interfacial Flow Instability in Multilayer Coextrusion, Polymer Engineering and Science, vol. 18(8), p. 620–3 (Jun. 1978).

Schrenk et al., Coextruded Multilayer Polymer Films and Sheet, Chapt. 15, Polymer Blends, vol. 2, 129, Academic Press, Inc. (1978).

Schrenk, W., New Developments in Coextrusion, International Conference on Advances In Polymer Processing, New Orleans, Louisiana, (Apr., 1991).

Schrenk, W. et al., Coextruded Iridescent Film, TAPPI Paper Synthetics Conference, Atlanta, Georgia, p. 141–5 (Sep. 27–29 1976).

Weber, Retroreflecting Sheet Polarizer, SID Conf. Proceedings, Boston, MA May 1992, SID 92 Digest, pp. 427–429.

Wu et al., High Transparent Sheet Polarizer Made With Birefringent Materials, Jpn. J. of App. Phys., vol. 34, p. L 997–9, part 2, No. 8A (Aug. 1995).

* cited by examiner

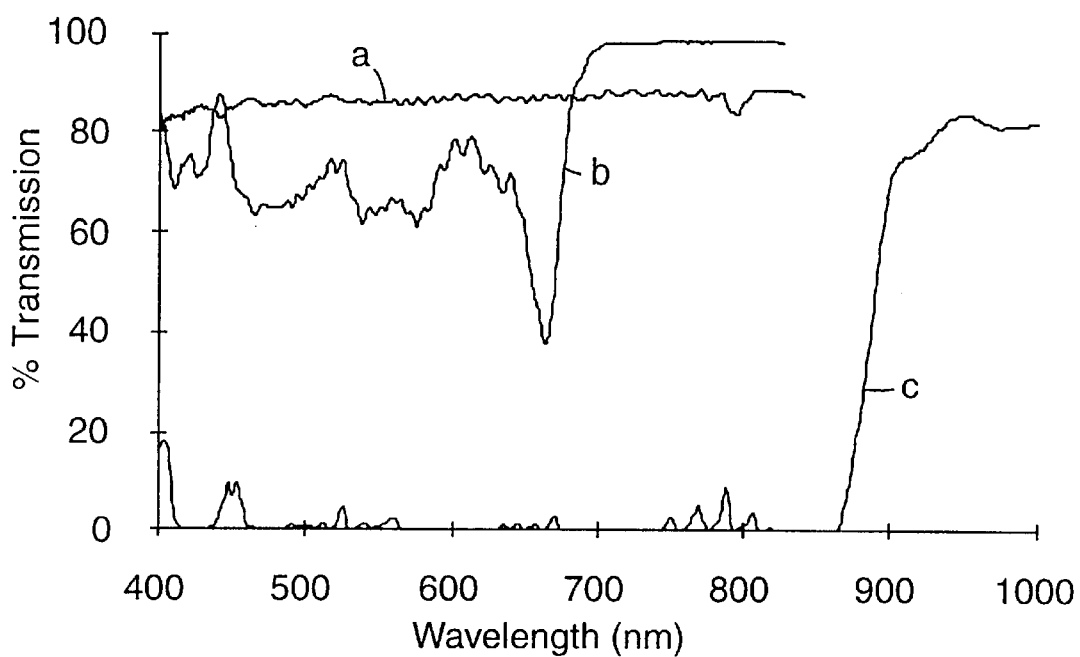
FIG.3
FIG.4
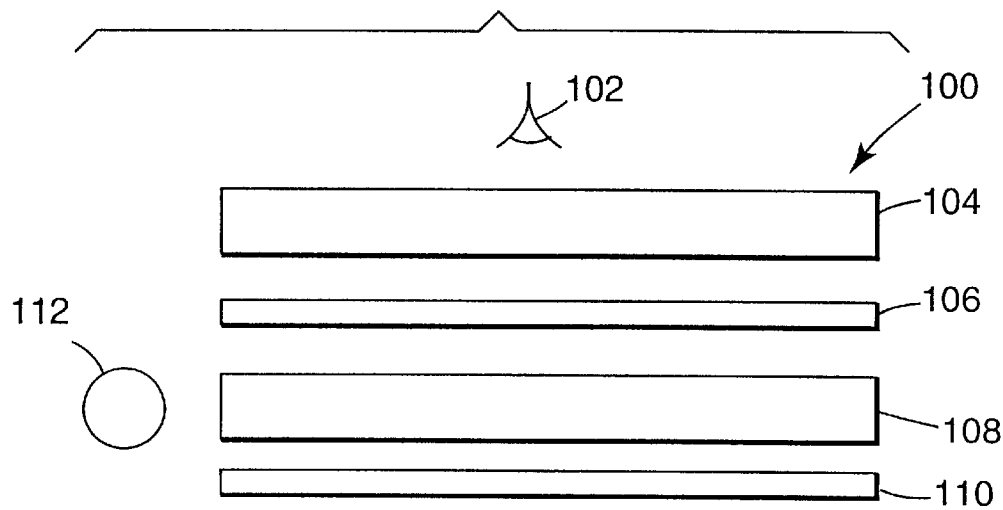

REFLECTIVE POLARIZERS HAVING EXTENDED RED BAND EDGE FOR REDUCED OFF AXIS COLOR

This application is a divisional application of U.S. application Ser. No. 09/143,475, filed Aug. 28, 1998, now U.S. Pat. No. 6,088,159, which is a continuation of U.S. application Ser. No. 08/690,527, filed Jul. 31, 1996, issued as U.S. Pat. No. 5,808,794.

BACKGROUND

This relates generally to reflective polarizers which transmit one polarization and reflect the other polarization. More particularly, this application relates to reflective polarizers having an extended red band edge in the off-axis transmission spectrum to reduce off axis color hue, or to select a particular hue.

One important use for reflective polarizers is in a light-recycling mode to provide brightness increase (gain) in liquid crystal display (LCD) applications. In these applications, the reflective polarizer is used in conjunction with a lightrecycling cavity, a light source, and a liquid crystal panel. Maximum luminance is achieved when the reflective polarizer is used in a brightness enhancement mode, such that light of the reflected polarization is "recycled" into the transmitted polarization by the reflective polarizer in combination with the light recycling cavity. Examples of such light recycling systems are described in copending and commonly assigned U.S. patent application Ser. No. 08/402,134, now U.S. Pat. No. 5,882,774, which is incorporated herein by reference.

The off axis color (OAC) problem with multilayer-type reflective polarizers is described in copending and commonly assigned U.S. patent application Ser. No. 08/402,041, which is incorporated herein by reference. OAC is also a problem with other types of reflective polarizers, such as cholesteric reflective polarizers. The multilayer reflecting polarizers described in the above mentioned U.S. patent application Ser. No. 08/402,041 show a very red or yellow OAC. In other words, the OAC has a distinct reddish or yellowish "hue". This is because the red band edge of the off axis transmission spectrum is shifted toward the blue. As a result, almost all p-polarized red light (600 nm and greater) is transmitted at off normal incidence, but some of the blue and green is reflected, giving the light at off normal incidence a definite reddish appearance. This hue is very objectionable in some applications, such as in the backlit LCD systems, where color control is highly important.

SUMMARY

To overcome the drawbacks in the art described above, and to provide various other advantages will become apparent upon reading and understanding the present specification, the present invention provides a reflective polarizer with an extended red band edge to reduce off axis color (OAC). The reflective polarizer has a OAC red band edge of at least 600 nm at a 45 degree angle of incidence, and has an average transmission from 400–800 nm of less than 20% for light polarized parallel to the extinction axis at normal incidence. This results in a more color balanced system in which the color bands across the visible spectrum are more evenly reflected, thus controlling the hue of the OAC.

BRIEF DESCRIPTION OF THE DRAWINGS

In the drawings, where like numerals refer to like elements throughout the several views:

FIG. 3 shows the transmission spectra of a reflective polarizer having an OAC red ban edge about 670 nm at a 60 degree angle of incidence;

FIG. 4 shows the reflective polarizer of the present invention in a liquid crystal display system.

DETAILED DESCRIPTION

Figure 1A:
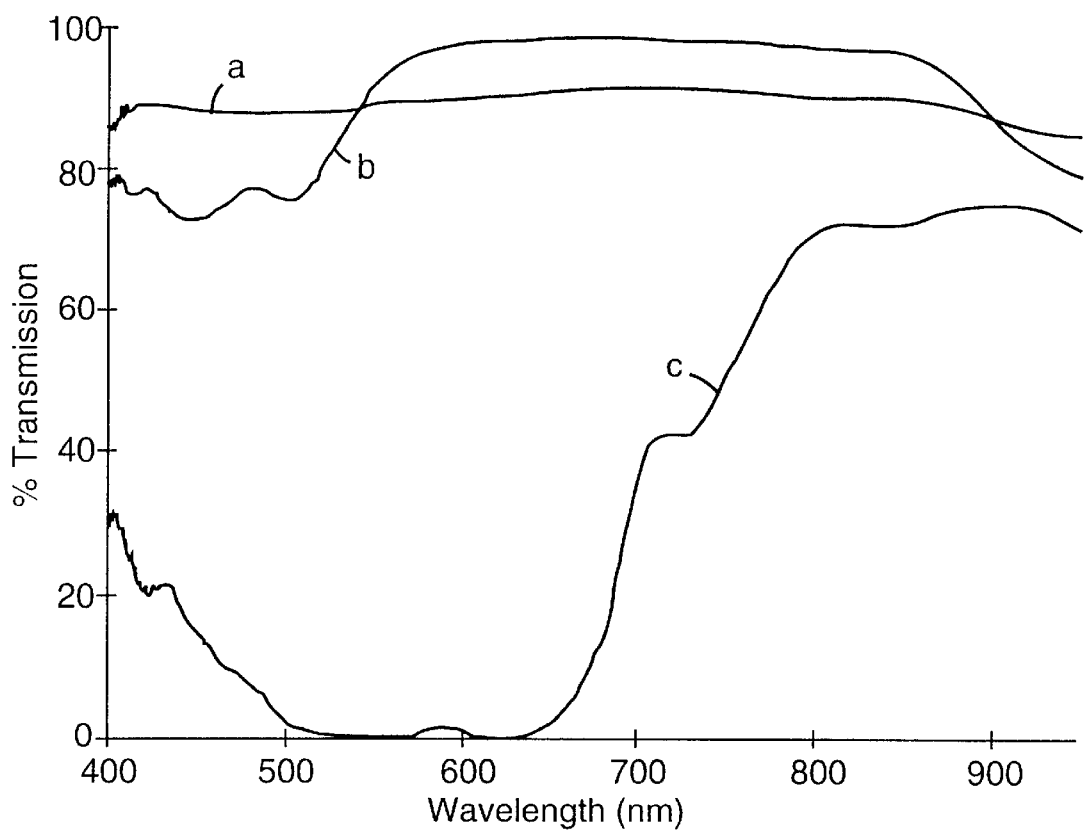
FIGS. 1A, 1B and 1C show the transmission spectra of three different prior art multilayer reflective polarizers.

In the following detailed description, reference is made to the accompanying drawings which form a part hereof, and in which is shown by way of illustration a specific embodiment in which the invention may be practiced. It is to be understood that other embodiments may be utilized and structural changes made without departing from the spirit and scope of the present invention.

Reflective polarizers act to transmit light of one polarization and reflect light of another polarization. The light that is transmitted is polarized parallel to the so-called transmission axis and the light that is reflected is polarized parallel to the so-called extinction axis. Reflective polarizers can function as a light-recycling film to provide increase in brightness (gain) when used in conjunction with a light-recycling cavity, a light source, and an absorbing polarizer such as is used in a liquid crystal display (LCD). This maximum luminance is the preferred state when the multilayer reflective polarizer is used as a brightness enhancement film.

Off axis color (OAC), or the colorful, iridescent look of a reflective polarizer at off-normal incidence, results from the incomplete and irregular transmission of p-polarized light through the transmission axis of the polarizer at angles away normal incidence. OAC will change with angle of incidence, thus, a particular OAC is specific to a particular angle of incidence. OAC can be seen graphically by measuring the transmission of p-polarized light polarized parallel to the transmission axis of the polarizer at off-normal incident angles. For purposes of the present description, the spectrum showing the transmission of light polarized parallel to the transmission axis of the polarizer at off-normal incidence will be referred to as the OAC spectrum. This characteristic of the OAC spectrum is one of the causes of the colorful or iridescent look of a reflective polarizer at angles away from the normal.

For multilayer-type reflecting polarizers, OAC is due in part to the out-of-plane (z) index mismatch between adjacent layers, as described in U.S. patent application Ser. No. 08/402,041. That application describes that to reduce OAC, the multilayer reflective polarizer should have a minimized out-of-plane z-index mismatch to produce a high transmission spectra for the transmission axis at any angle of incidence for p-polarized light.

The multilayer reflecting polarizers exemplified in the above-mentioned U.S. patent application Ser. No. 08/402,041 showed a very red or yellow OAC. In other words, the OAC of those polarizers had a distinct yellowish or reddish cast or "hue", as it will be referred to herein for purposes of illustration. The OAC hue is due to the "shift" of the OAC spectrum from that of the extinction spectrum at normal incidence when moving from normal to higher angles of incidence. For example, the spectra of the multilayer reflecting polarizer shown in FIG. 1A has a 670 nm band edge for the extinction axis at normal incidence (curve c), and a 565 nm band edge for the OAC spectrum at a 60 degree angle of incidence (curve b). The OAC band edge thus "shifts"

toward the blue when moving from normal incidence to higher angles of incidence. The OAC hue for FIG. 1 A is very objectionable. This is because the color bands across the visible spectrum are not evenly reflected. Almost all p-polarized red light (600 nm and greater) and much of the p-polarized yellow light (565 nm and greater) for curve b is transmitted, but some of the blue and green is reflected, giving a definite reddish or yellowish appearance to the light transmitted at off normal incidence.

Figure 1B:
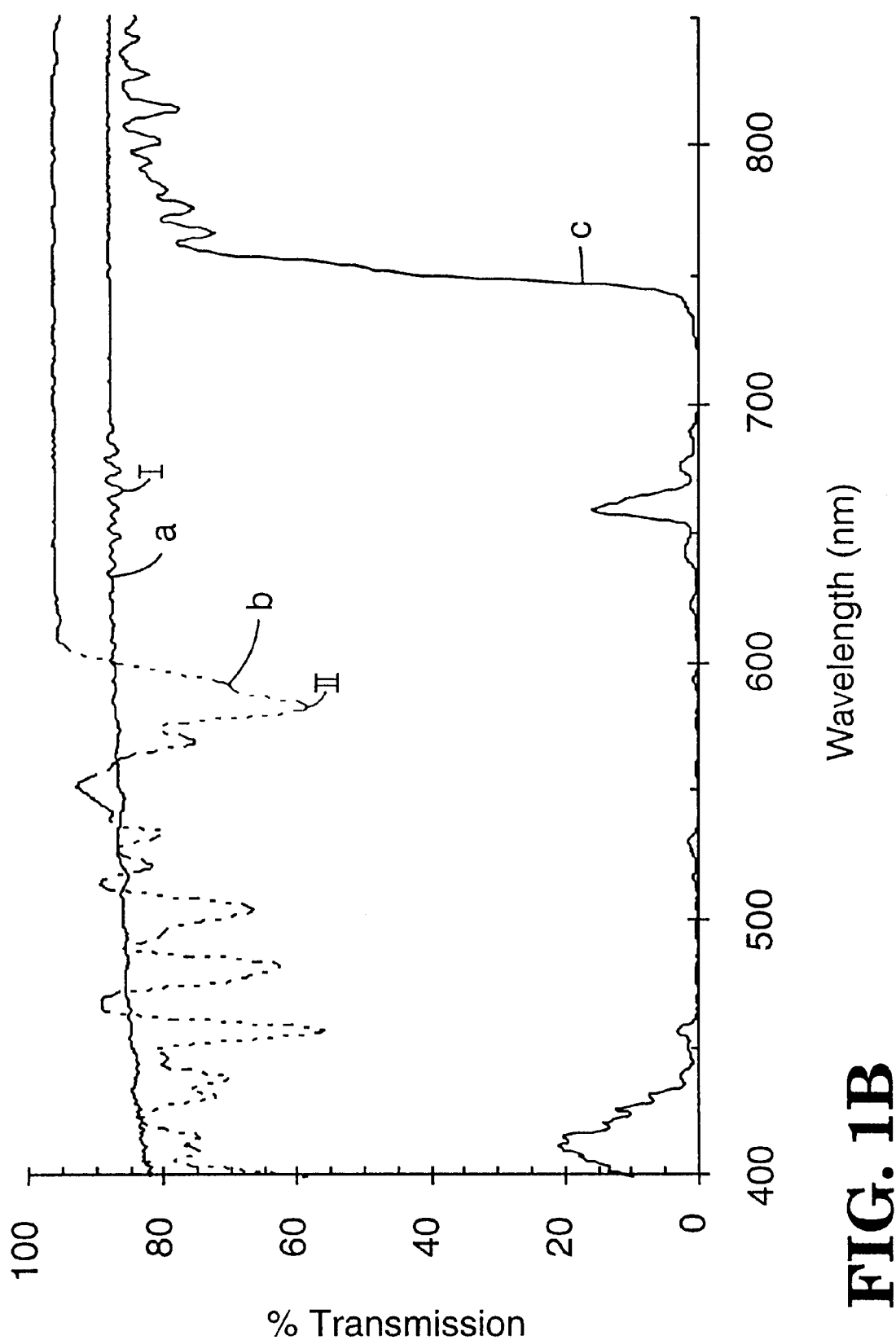
Figure 1C:
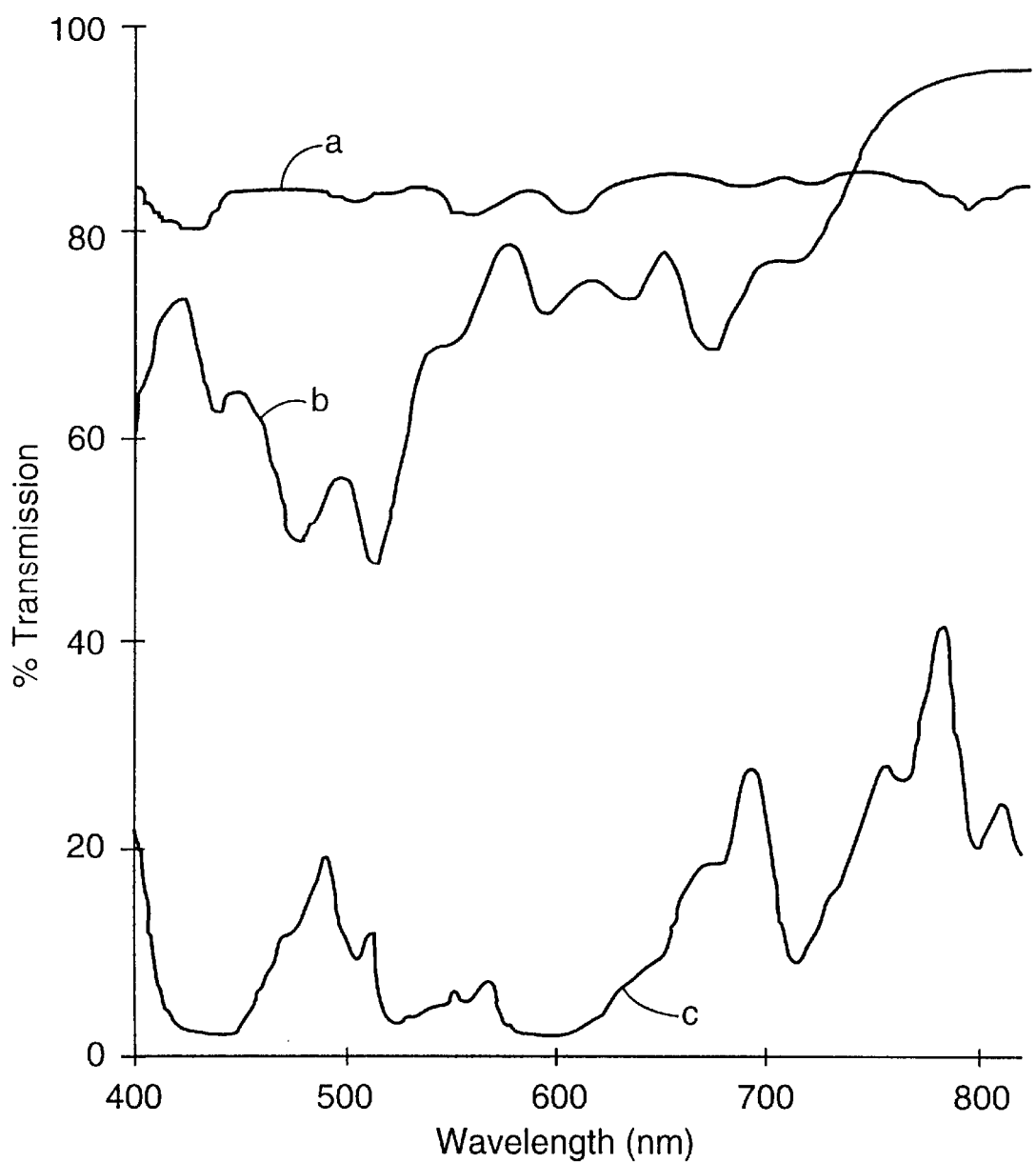
Figure 2:
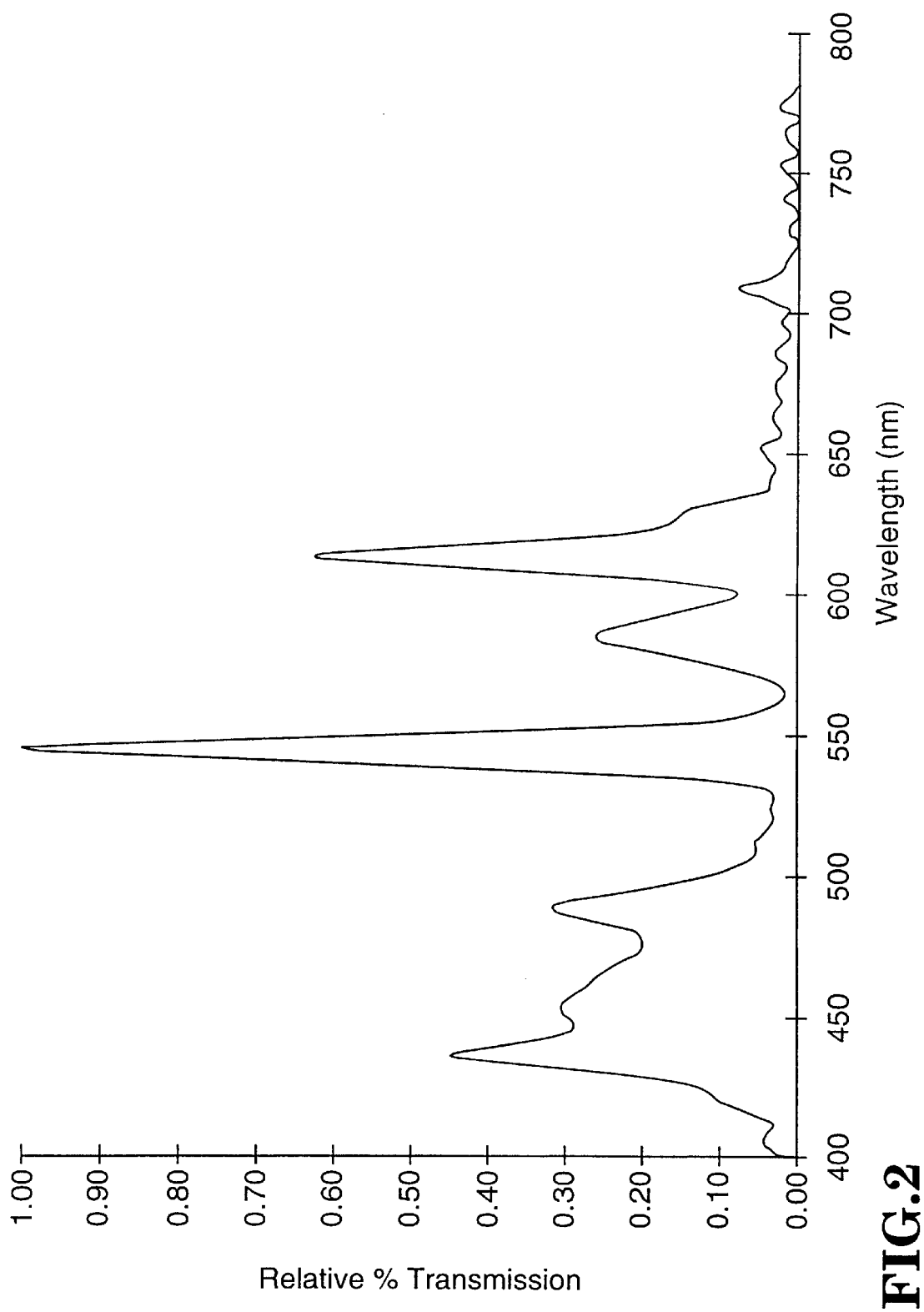
FIG. 2 shows the transmission spectra of a typical CCFT.

The OAC hue of a reflective polarizer can be a problem in LCD systems, because the OAC red band edge for previously described reflective polarizers such as that shown in FIG. 1A is lower than the red emission peak for the typical light source used to illuminate the LCD. The light source most often used for the application of laptop computers and other LCD displays is a cold-cathode fluorescent tube (CCFT). Although the spectra for CCFT's made by different manufactures will vary, a representative CCFT characteristic emission spectra for an Apple 540c TFT computer is shown in FIG. 2. The location and relative magnitude of the red, green, and blue emission peaks of CCFTs are determined by selection of specific phosphors based on desired color temperature. For the CCFT of FIG. 2, the red peak is located at about 610 nm, the green peak is located at about 550 nm, and several blue peaks are located between 420 and 500 nm.

Comparing FIGS. 1A and 2, it can be seen that the red emission peak (610 nm) for the CCFT of FIG. 2 is higher than the OAC red band edge of the reflective polarizer (565 nm) of FIG. 1A. Since the OAC red band edge is lower than the emission peak for the CCFT, most of the red and green light emitted by the CCFT is transmitted through the reflective polarizer at angles away from the normal. This high transmission for the red and green combined with the lower amount of transmission for the blue results in a yellow appearing OAC. This color is very objectionable in some applications, especially in backlit LCD displays, where display color balance and brightness are extremely important.

Extended OAC Red Band Edge

Although it has been recognized that OAC in general is undesirable for many applications, the present invention further recognizes that the hue of the OAC is also an important factor to consider. The present invention further recognizes that the hue is affected by the red band edge of the OAC spectrum at off-normal incidence and by the relative transmission of red versus green and blue light. In particular, the hue of the transmitted light at off normal incidence is greatly affected by the position of this red band edge.

In liquid crystal display applications, it is generally preferred that the OAC is tuned so that the color shifts from white to blue rather than white to red. Given this preference, certain hues of OAC are more preferable than others when a reflective polarizer is used in a display system. An off-angle spectrum which is flat at 60 degrees is most preferable, as there is no perceived color at angle due to the addition of the reflective polarizer. In the even that a flat OAC spectrum cannot be achieved, blue OAC is less preferred but still acceptable, while green OAC is still less preferred, and red OAC is least preferred, especially when the reflective polarizer is used in a brightness enhancing mode in an LCD application.

Most cold cathode fluorescent tubes do not have red emission lines above 630 nm. The present invention has recognized that better display color balance is possible if the OAC spectrum reflects evenly throughout the range of the lamp spectrum. Or, if this is not possible, the OAC should reflect more red light than blue or green light. To accomplish this, the present invention has recognized that the OAC spectrum is desirably extended further into the red than that shown in FIG. 1A. Preferably, the OAC spectrum is shifted beyond the boundary for red light, or at least 600 nm. Even more preferably, the OAC spectrum is desirably extended further into the red than any red emission peak of an associated light source providing light into a system in which the reflective polarizer is being used.

To reduce the hue of any OAC in a reflective polarizer, the present invention has identified a useful parameter that will be referred to herein as the "OAC red band edge". For purposes of the present specification, the OAC red band edge is defined as the wavelength at which the reflectance of the polarizer along the transmission axis at off normal incidence (the OAC spectrum) for p-polarized light increases from the baseline value to 10 percent of the OAC spectrum's peak reflection value. Although only transmission (T) is shown here, reflection (R) can be assumed to be given by 1–T because absorption is on the order of 1 percent. The baseline reflectance value can be taken in the far red or infrared where no optical layers are tuned to cause reflectance. The red band edge is then taken to be the red edge of the longest wavelength band in the OAC spectrum.

FIG. 3 shows the spectra for a reflective polarizer according to the present invention. The OAC red band edge is about 670 nm at a 60 degree angle of incidence. The average transmission from 400–700nm for the extinction axis at normal incidence (curve c) is about 1.4%. The Example below describes how the polarizer of FIG. 3 was made. Reflective polarizers such as that shown in FIG. 3 are advantageous for applications such as LCD's, because the hue of any OAC will not appear red or yellow across the useable viewing angle of the LCD. The preferred wavelength at a given angle of the OAC red band edge will vary depending upon the application with which the reflective polarizer is to be used. The key factors are the wavelengths to be considered and the useful viewing angle necessary for the particular application. In general, however, to achieve the desirable control of hue of any OAC which may be present in any reflective polarizer, the OAC red band edge is desirably at least 600 nm at a 45 degree angle of incidence, preferably at least 620 nm at 60 degrees, more preferably at least 650 nm at 60 degrees, and most preferably at least 650 nm at a 75 degree angle of incidence. For LCD applications, where display uniformity is of the utmost importance, the OAC red band edge is desirably at least 630 nm at a 60 degree angle of incidence, is preferably at least 630 nm at an 80 degree angle of incidence, and is even more preferably at least 650 nm at an 80 degree angle of incidence.

For multilayer-type reflecting polarizers of the type described in the above-mention Ser. No. 08/402,041, the shift in the red band edge of the OAC spectrum from that of the extinction spectrum was more than expected from the conventional n*d*cos(theta) formula of isotropic materials. For the multilayer-type reflective polarizer described in Example 1 below and shown in FIG. 3, the shift is due to the biaxial birefringence of the PEN layer. First consider only the in-plane indices. Curves b and c are taken along orthogonal axes. Along the extinction axis, the PEN index is high, approximately 1.83 at 870 nm. However, along the transmission axis, the in-plane index is much lower, about 1.60. This makes the PEN layers much thinner optically in the nonstretch direction than in the stretch direction. The OAC spectrum is due to a combination of both the y and z-index differential, and in the limit of normal incidence, is only due to the y-index differential, if there is one. A small y-index differential in Example 1 allows one to find the red band edge of curve b at normal incidence in this limit. The small peak labeled I on curve "a" is the red band edge for the sample in the limit of normal incidence. This peak is shifted from the red band edge of curve c due to the large difference in PEN index (about 0.23) along the extinction and transmission axes for this particular polarizer. The red edge of the peak labeled II on curve "b" is the OAC red band edge at a 60 degree angle of incidence. Note how both of these positions are shifted toward the blue from the red band edge of curve "c".

In the multilayer-type reflective polarizers described in the example below and shown in FIG. 3, the low z-index of the PEN layer contributes further to the blue shift. This is because the p-polarized light at high angles of incidence senses the low z-index value of 1.49 instead of only the in-plane value of 1.62 at 633 nm, resulting in a further reduced effective index of refraction of the PEN layers. Along the extinction axis this latter effect is more pronounced because the difference in the PEN in-plane index to the PEN z-axis index is much greater: 1.83–1.49, at 850 nm, resulting in a greater blue shift than that of conventional isotropic multilayer film stacks, for p-polarized light. For biaxially oriented films of multilayer PEN/(low index isotropic polymers), or any birefringent polymer used to make mirrors, the shift is also substantial. For mirrors made with PEN with equal stretch along the two major axes, the in-plane/z-axis index differential is about 1.74–1.49. This effect must be accounted for when designing mirrors that must reflect all visible light at all angles of incidence, i.e., the red band edge at normal incidence must be placed at a longer wavelength than anticipated from the in-plane indices alone.

For certain reflecting polarizers, such as the multilayer-type reflecting polarizer of FIG. 3, to increase the optical bandwidth of the OAC in a reflective polarizer, the extinction bandwidth of the polarizer must also be increased. In other words, to increase the OAC red band edge (curve b), the extinction band edge (curve c) must also be increased. To accomplish this in a multilayer-type reflecting polarizer with the same values of extinction along the x-axis, more film layers can be added, tuned specifically to the longer wavelengths. The precise number of layers in the film will depend upon the birefringence of the materials used to make the film. The performance of a PEN/coPEN polarizer with acceptable extinction throughout the visible spectrum, but reddish OAC, is given by the spectra in FIG. 1B. This polarizer is made with approximately 600 layers, involving a 150 layer feedblock and two multipliers. A more detailed description of the polarizer shown in FIG. 1B can be found in U.S. patent application Ser. No. 08/494,416, which is incorporated herein by reference. Curve b shows the tranmission of p-polarized light polarized parallel to the transmission axis at a 50 degree angle of incidence. The average transmission of curve a from 400–700 nm is about 86.2%. The average transmission of curve b from 400–700 nm is about 84.2%. The average transmission of curve c from 400–800 nm is about 11.8%. The OAC red band edge of curve b is about 605 nm. The red band edge of curve c is about 745 nm. To increase the OAC bandwidth of curve b, and maintain the good extinction of curve c, the number of layers was increased to approximately 832. This was accomplished with a 209 layer feedblock and two multipliers. The resulting polarizer performance, with both good extinction and better color balanced OAC, is shown by the spectra of FIG. 3.

When extending the extinction band edge for a reflecting polarizer, the extinction band edge (curve c) in is desirably at least 800 nm, preferably at least 830 nm, and more preferably at least 850 nm, and even more preferably 900 nm. The precise extinction red band edge will vary, however, depending upon the relationships between the x, y, and z indices of refraction of individual layers of the film and of their relationships between film layers.

A different but less desirable method of producing an polarizer having an extended OAC red band edge without using more layers is simply to redesign the existing layer thickness distribution, i.e. take layers assigned to the midspectrum wavelengths and tune them to longer wavelengths. The spectra of such a film was described in the above-mentioned U.S. patent application Ser. No. 08/402,041. The spectra of that polarizer is reproduced here in FIG. 1C. This method is unacceptable for many applications, however, because the resulting 600 layer polarizer shows significant spectral leaks in both the midspectrum and near IR. These leaks are due to the smaller number of layers tuned to a given wavelength and the difficulty of controlling layer thicknesses so that the reflective polarizer reflects light uniformly at all wavelengths. The average transmission of curve c (extinction at normal incidence) is about 9% from 400 to 700 nm. However, the average transmission from 700 to 800 nm is over 20%. This is significant, because at a 60 degree angle of incidence, that portion of the spectrum from 700 to 800 nm blue shifts into the red portion of the visible spectrum, resulting in a 20% average transmission in the red wavelengths. Such leaks will seriously upset the color balance of a backlit LCD system. In addition, the color balance of curve b is such that less red light is reflected than blue or green, and the OAC will have a red hue at low angles, and a yellow hue at high angles, both of which are unacceptable in a LCD application.

Applying the principles described above, a preferred reflective polarizer combines the desired transmission and extinction performance with the minimum OAC and minimum OAC red band edge. Average transmission values as described herein include both front and back surface reflections in air. The average transmission from 400–700 nm for the transmission axis at normal incidence is desirably at least 80%, preferably at least 85%, more preferably at least 90%. The average transmission from 400–700 nm for the transmission axis at a sixty degree angle of incidence is desirably at least 60%, preferably at least 70%, more preferably at least 85%, and even more preferably at least 95%.

The average transmission from 400–800 nm for the extinction axis at normal incidence is desirably less than 12%, preferably less than 10%, more preferably less than 5%, and even more preferably less than 2%. The average transmission from 400–700 nm for the extinction axis at a sixty degree angle of incidence is desirably less than 20%, preferably less than 15%, more preferably less than 10%, and even more preferably less than 5%.

And, as discussed above, the OAC red band edge for a reflective polarizer is desirably at least 600 nm at a 45 degree angle of incidence, preferably at least 620 nm at 60 degrees, more preferably at least 650 nm at 60 degrees, and most preferably at least 650 nm at a 75 degree angle of incidence. For LCD applications, where display color balance is of the utmost importance, the OAC red band edge is desirably at least 630 nm at a 60 degree angle of incidence, is preferably at least 630 nm at an 80 degree angle of incidence, and is even more preferably at least 650 nm at an 80 degree angle of incidence. It is also preferable that the reflectivity of red light is greater thanteh reflectivity of blue or green light.

The concept of OAC red band edge is not limited to multilayer-type reflective polarizers. The concept applies to any type of reflective polarizer. Exemplary multilayer-type reflective polarizers are described in, for example, the above-mentioned U.S. patent application Ser. No. 08/402,041, EP patent application 0 488 544 A1, U.S. Pat. No. 3,610,729 (Rogers), and U.S. Pat. No. 4,446,305 (Rogers). Other types of reflective polarizers include cholesteric reflective polarizers or the retroreflecting polarizer described in U.S. Pat. No. 5,422,756 (Weber). Regardless of which type of reflective polarizer is used, it will always be important to ensure that the red band edge of the OAC spectrum satisfies the requirements described herein to control the OAC hue. The reflective polarizers described herein are also useful for a wide variety of applications. The reflective polarizers are useful for backlit, reflective and transflective LCD applications, window film for polarization and/or energy control, and many other applications which will be apparent to those of skill in the art.

FIG. 4 shows an representative backlit LCD system 100 including a reflective polarizer 106 of the present invention. The system is viewed by observer 102. The LCD system 100 also includes an LCD panel 104, light guide 108, lamp 112, and reflector 110. The system could also include, among other things, brightness enhancement films, prismatic or structured surface brightness enhancement films, compensation and/or retardation films, diffusers, absorbing polarizers and the like. Although the system shown in FIG. 6 is backlit, the reflective polarizer is also useful for reflective and transflective displays. Other exemplary LCD systems with which the present reflective polarizers could be used are described in copending and commonly assigned U.S. patent application Ser. Nos. 08/402,134, 08/514,172, 08/494,776, and 08/402,042, all of which are incorporated herein by reference.

EXAMPLE

A coextruded film containing about 833 layers was produced by extruding web onto a chilled casting wheel and continuously orienting the film in a tenter. A polyethylene naphthalate (PEN) with an Intrinsic Viscosity of 0.48 dl/g (60 wt. % phenol/40 wt. % dichlorobenzene) was delivered by one extruder at a rate of 75 pounds per hour (34.1 kg/hour) and 70/0/30 CoPEN (70 mol% 2,6 NDC and 30 mol% DMI) with an IV of 0.58 dl/g was delivered by another extruder at a rate of 85 pounds per hour (38.6 kg/hour). These meltstreams were directed to the feedblock to create the CoPEN and PEN optical layers. The feedblock created 209 alternating layers of PEN and CoPEN 70/0/30 with the two outside layers of CoPEN serving as the protective boundary layers (PBL's) through the feedblock. An approximate linear gradient in layer thickness was produced by the feedblock for each material with the ratio of thickest to thinnest layers being about 1.30. After the feedblock a third extruder delivered the same 70/0/30 COPEN as symmetric PBL's (same thickness on both sides of the optical layer stream) at about 28 pounds per hour (12.7 kg/hour). The material stream passed though an asymmetric two times multiplier (such as that described in U.S. Pat. Nos. 5,094,788 and 5,094,793) with a multiplier ratio of about 1.25. The multiplier ratio is defined as the average layer thickness of layers produced in the major conduit divided by the average layer thickness in the minor conduit. The material stream then passed though an asymmetric two times multiplier with a multiplier ratio of about 1.5.After the multiplier, a thick symmetric PBL was added at about 113 pounds per hour (51.4 kg/hour) that was also fed from the third extruder. Then the material stream passed through a film die and onto a water cooled casting wheel using an inlet water temperature of about 56 degrees F (13° C.). The optical layers exhibited a monotonically increasing thickness profile from the casting wheel side to the air side of the film. The thinnest optical layers were closest to the casting wheel. The CoPEN melt process equipment was maintained at about 530° F. (277° C.); the PEN melt process equipment was maintained at about 545° F. (285° C.).; and the feedblock, multipliers, skin-layer modules, and die were maintained at about 540° F. (282° C.).

All stretching was done in the tenter. The film was preheated to about 303° F. (150° C.) in about 20 seconds and drawn in the transverse direction to a draw ratio of about 6.7 at a rate of about 25% per second. The finished film had a final thickness of about 0.005 inches (0.125 mm). The optical spectra are shown in FIG. 3. Curve a is the transmission at normal incidence of light polarized parallel to the nonstretch direction (i.e., the transmission direction or transmission axis). Curve b is the transmission of p-polarized light along this same direction, but at 60 degrees angle of incidence. Curve c gives the transmission at normal incidence of light polarized parallel to the stretch direction (i.e., the extinction direction or the extinction axis). The red band edge for the extinction axis (curve c), as defined by the wavelength where the transmission value exceeds the 10% value, is approximately 870 nm. The red band edge for the OAC spectrum (curve b), defined as the wavelength at which the reflectance for the transmission axis at off normal incidence increases from the baseline value to 10 percent of the band's peak reflection value is approximately 670 nm. The average transmission of curve a from 400–700nm is 87%. The average transmission of curve b from 400–700nm is 70%. The average transmission of curve c from 400–800nm is 1.4%.

In the event that the reflective polarizer is a multilayered-type reflective polarizer, suitable materials which could be used as layers in the film include polyethylene naphthalate (PEN) and isomers thereof (e.g., 2,6-, 1,4-, 1,5-, 2,7-, and 2,3-PEN), polyalkylene terephthalates (e.g., polyethylene terephthalate, polybutylene terephthalate, and poly-1,4-cyclohexanedimethylene terephthalate), polyimides (e.g., polyacrylic imides), polyetherimides, atactic polystyrene, polycarbonates, polymethacrylates (e.g., polyisobutyl methacrylate, polypropylmethacrylate, polyethylmethacrylate, and polymethylmethacryiate), polyacrylates (e.g., polybutylacrylate and polymethylacrylate), syndiotactic polystyrene (sPS), syndiotactic poly-alpha-methyl styrene, syndiotactic polydichlorostyrene, copolymers and blends of any of these polystyrenes, cellulose derivatives (e.g., ethyl cellulose, cellulose acetate, cellulose propionate, cellulose acetate butyrate, and cellulose nitrate), polyalkylene polymers (e.g., polyethylene, polypropylene, polybutylene, polyisobutylene, and poly(4-methyl)pentene), fluorinated polymers (e.g., perfluoroalkoxy resins, polytetrafluoroethylene, fluorinated ethylene-propylene copolymers, polyvinylidene fluoride, and polychlorotrifluoroethylene), chlorinated polymers (e.g., polyvinylidene chloride and polyvinylchloride), polysulfones, polyethersulfones, polyacrylonitrile, polyamides, silicone resins, epoxy resins, polyvinylacetate, polyether-amides, ionomeric resins, elastomers (e.g., polybutadiene, polyisoprene, and neoprene), and polyurethanes. Also suitable are copolymers, e.g., copolymers of PEN (e.g., copolymers of 2,6-, 1,4-, 1,5-, 2,7-, and/or 2,3-naphthalene dicarboxylic acid, or esters thereof, with (a) terephthalic acid, or esters thereof; (b) isophthalic acid, or esters thereof, (c) phthalic acid, or esters thereof; (d) alkane glycols; (e) cycloalkane glycols (e.g., cyclohexane dimethanol diol); (f) alkane dicarboxylic acids; and/or (g) cycloalkane dicarboxylic acids (e.g., cyclohexane dicarboxylic acid)), copolymers of polyalkylene terephthalates (e.g., copolymers of terephthalic acid, or esters thereof, with (a) naphthalene dicarboxylic acid, or esters thereof; (b) isophthalic acid, or esters thereof; (c) phthalic acid, or esters thereof; (d) alkane glycols; (e) cycloalkane glycols (e.g., cyclohexane dimethanol diol); (f) alkane dicarboxylic acids; and/or (g) cycloalkane dicarboxylic acids (e.g., cyclohexane dicarboxylic acid)), styrene copolymers (e.g., styrene-butadiene copolymers and styrene-acrylonitrile copolymers), and copolymers of 4,4'-bibenzoic acid and ethylene glycol. In addition, each individual layer may include blends of two or more of the above-described polymers or copolymers (e.g., blends of SPS and atactic polystyrene). The coPEN described may also be a blend of pellets where at least one component is a polymer based on naphthalene dicarboxylic acid and other components are other polyesters or polycarbonates, such as a PET, a PEN or a co-PEN.

Particularly preferred combinations of layers in the case of polarizers include PEN/co-PEN, polyethylene terephthalate (PET)/co-PEN, PEN/sPS, PET/sPS, PEN/Eastar, and PET/Eastar, where "co-PEN" refers to a copolymer or blend based upon naphthalene dicarboxylic acid (as described above) and Eastar is polycyclohexanedimethylene terephthalate commercially available from Eastman Chemical Co.

Although specific embodiments have been shown and described herein for purposes of illustration of exemplary embodiments, it will be understood by those of ordinary skill that a wide variety of alternate and/or equivalent implementations designed to achieve the same purposes may be substituted for the specific embodiments shown and described without departing from the scope of the present invention. Those of ordinary skill will readily appreciate that the present invention could be implemented in a wide variety of embodiments, including different types of reflective polarizers. This application is intended to cover any adaptations or ariations of the preferred embodiments discussed herein. Therefore, it is intended hat this invention be defined by the claims and the equivalents thereof

We claim:
1. A liquid crystal display (LCD) system, comprising:
   a light source including a light guide and a bulb disposed adjacent an edge of the light guide;
   an LCD panel; and
   a reflective polarizer disposed in an optical path between the LCD panel and the light source to transmit a first polarization state of light while reflecting a second polarization state of light, the reflective polarizer having an off-axis reflection spectrum for light incident on the reflective polarizer at an angle other than normal that is different than the reflection spectrum for light incident at an angle normal to the reflective polarizer, the off-axis reflection spectrum reflecting at least as much red light as blue or green light over a usable viewing angle of the LCD panel such that a hue of the display will not appear red across the usable viewing angle.

2. A system as recited in claim 1, wherein the off-axis reflection spectrum reflects more red light than blue or green light.

3. A system as recited in claim 1, wherein the usable viewing angle of the LCD panel is 45°.

4. A system as recited in claim 3, wherein the reflective polarizer comprises a multilayer-type reflective polarizer.

5. A system as recited in claim 1, wherein the usable viewing angle of the LCD panel is 60°.

6. A system as recited in claim 1, wherein the reflective polarizer comprises a cholesteric reflective polarizer.

7. A liquid crystal display (LCD) system, comprising:
   a light source;
   an LCD panel; and
   a reflective polarizer disposed in an optical path between the LCD panel and the light source to transmit a first polarization state of light while reflecting a second polarization state of light, the reflective polarizer having an off-axis reflection spectrum for light incident on the reflective polarizer at a plurality of angles corresponding to a usable viewing angle of the LCD panel such that a hue of the display is not red or yellow across the usable viewing angle of the LCD panel.

8. A system as recited in claim 7, wherein the usable viewing angle of the LCD panel is 45°.

9. A system as recited in claim 8, wherein the reflective polarizer comprises a multilayer-type reflective polarizer.

10. A system as recited in claim 8, wherein the reflective polarizer comprises a cholesteric reflective polarizer.

11. A system as recited in claim 7, wherein the usable viewing angle of the LCD panel is 60°.

* * * * *